June 9, 1964  J. PICKLES  3,136,524
VEHICLE SEAT TRACK
Filed June 18, 1962  2 Sheets-Sheet 2
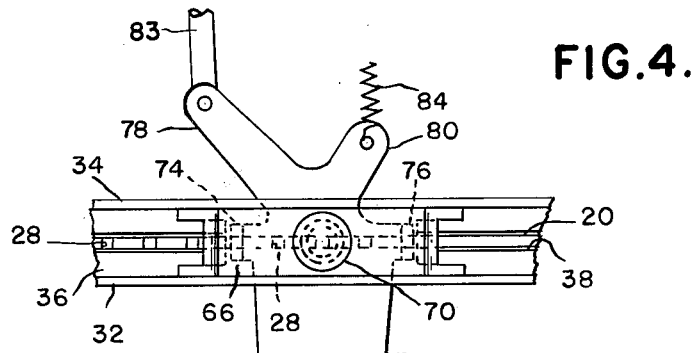
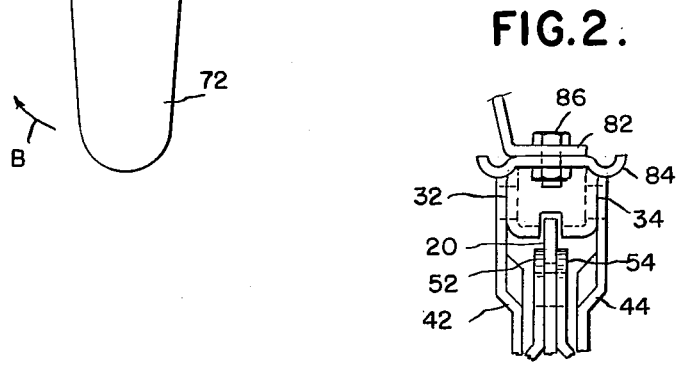
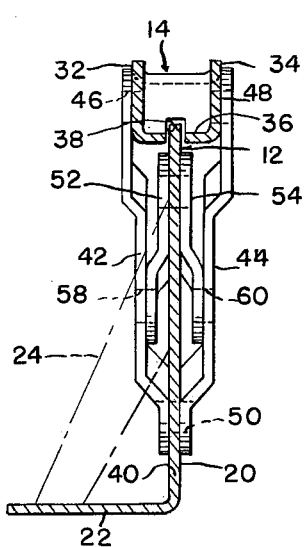
INVENTOR.
JOSEPH PICKLES
BY
ATTORNEYS United States Patent Office 3,136,524
Patented June 9, 1964

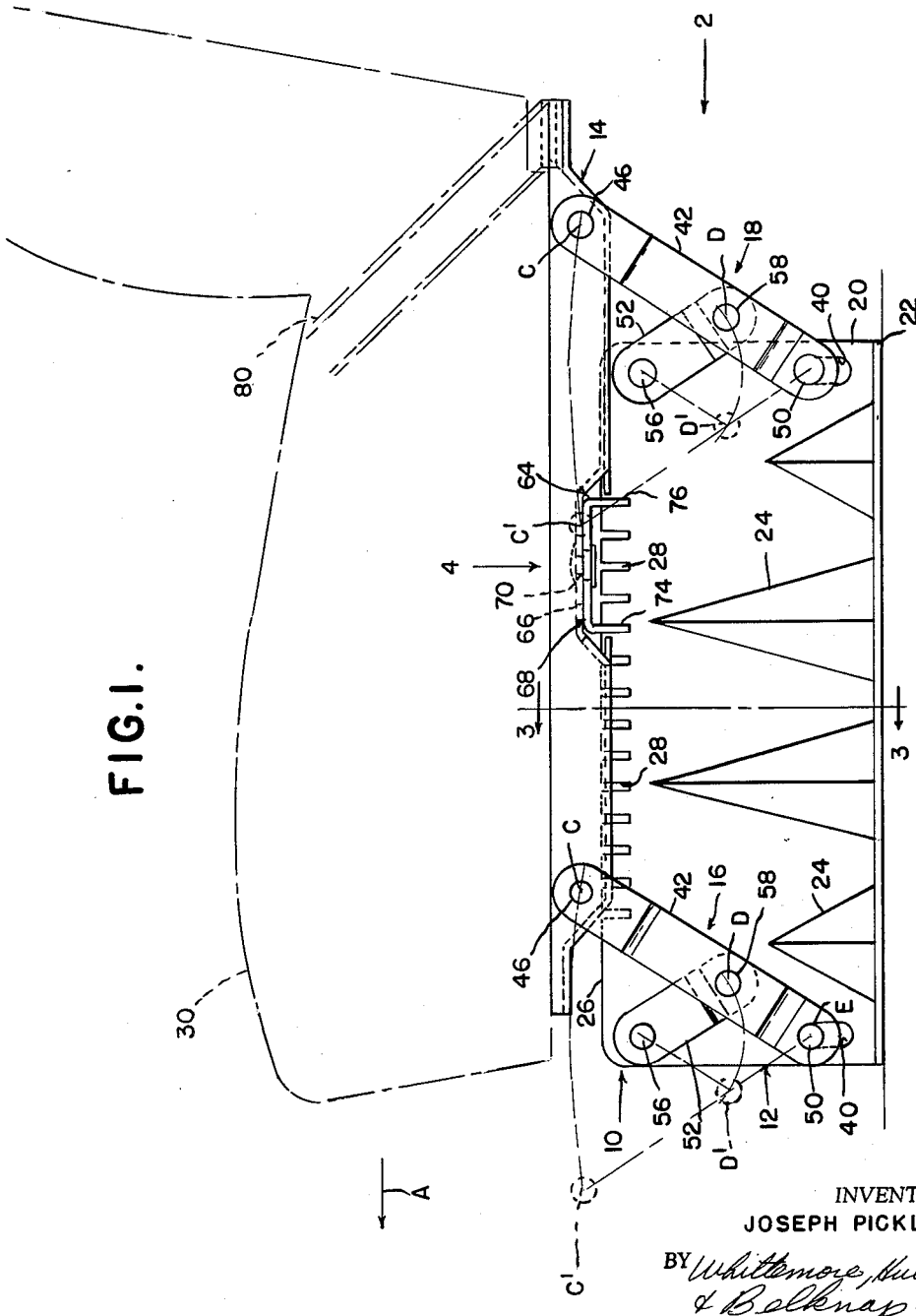

3,136,524
VEHICLE SEAT TRACK
Joseph Pickles, Dearborn, Mich., assignor to Ferro Stamping Company, Detroit, Mich., a corporation of Michigan
Filed June 18, 1962, Ser. No. 203,254
5 Claims. (Cl. 248—424)

The present invention relates to a slideless seat supporting and adjusting device.

The present invention relates further to the art of adjustable, manually operated seat mechanisms for automobiles. At the present time, slidable type seat track assemblies are utilized which generally permit fore and aft movement of the seat support about a longitudinal axis of the vehicle. The slidable tracks are designed to provide a predetermined definite pre-loading of the structure to permit the seat to operate throughout its normal life without excessive rattling. With such a construction the slidable track assemblies, which are under some initial preload, do not lend themselves to accurate calculation of the strength opposing separation between the track sections.

The seat track of the present invention was designed primarily to provide a sufficiently strong connection between the stationary member or support and the movable member or support to permit connection of a seat belt to the seat support rather than to the floor or body of the vehicle as is presently the case. In the case of slidable track assemblies considerable difficulty is encountered in meeting this requirement because of the initial preload of the track assemblies.

The present invention provides a link type support between the stationary and movable members in which the seat is movable fore and aft on swinging links arranged to provide for substantially horizontal movement of the seat. Such a construction permits accurate calculation of the stresses involved, since the forces are applied generally longitudinally of the links and transversely of the pivot pins so that the forces developed are essentially in tension and shear of true geometrical shapes.

It is accordingly an object of the present invention to provide a slideless seat supporting and adjusting device comprising a stationary member, a movable seat supporting member, and a swingable link type support interposed between the members, said support including swinging links arranged to provide for substantially horizontal movement of the movable seat supporting member.

Another object of the present invention is to provide a device of the aforementioned type which is manually operated.

Still another object of the present invention is to provide a device of the aforementioned type wherein adjustable latch means is provided between the movable and stationary members effective to latch the linkage and movable members in a selected adjusted position.

A further object of the present invention is to provide a device of the aforementioned type wherein the latch means includes a series of teeth in the upper edge of the stationary member, and a latch carrier by the movable member for selected engagement with the aforesaid teeth.

A still further object of the present invention is to provide a slidable seat supporting and adjusting device comprising a stationary member having slots thereon, a movable seat supporting member, spaced guide links interconnecting said members, said guide links being pivoted at one of their ends to the movable members, pin means on the other ends of said guide links slidably received in the slots, spaced suspension links pivoted on one end to the stationary member and on the other ends to an intermediate portion of the guide links, said movable member being movable relative to the stationary member through the aforesaid links, and adjustable latch means provided between the members to locate the movable member in a selected adjusted position.

Another object of the present invention is to provide a device of the aforementioned type wherein the pivot connection between the suspension links and stationary member are located substantially directly above the vertical slots.

A further object of the present invention is to provide a device of the aforementioned type wherein the movable member includes anchor means for a seat belt.

A still further object is to provide a device of the aforementioned type wherein the guide links each have a length greater than the length of the suspension links.

Another object of the present invention is to provide a device of the aforementioned type wherein the forces are applied generally longitudinally of the links and transversely of the pivot pins so that the forces developed are essentially in tension and shear.

It is thus another object of the invention to provide a simplified, low-cost structure of the aforementioned type having certain advantages contributing to efficiency, reliability, and long life, as well as ease of maintenance.

Further objects and advantages of the present invention will be apparent from the following description, reference being had to the accompanying drawings wherein a preferred form of the present invention is clearly shown.

FIGURE 1 is an elevational view of the seat supporting and adjusting mechanism with the seat, including the movable member, being located in its rearward position.

FIGURE 2 is a fragmentary end view looking in the direction of arrow 2 of FIGURE 1.

FIGURE 3 is a view, partly in section, looking in the direction of arrows 3—3 of FIGURE 1.

FIGURE 4 is a plan view of the latch mechanism looking substantially in the direction of arrow 4 of FIGURE 1.

Referring now to the figures, there is shown a single device or mechanism for supporting and adjusting a seat, as an example, the front seat of an automobile. It will be appreciated that two such devices are provided and that these devices are connected to opposite ends of the seat.

Referring to the drawings, in FIGURE 1 the seat supporting and adjusting device is designated by the numeral 10 and comprises an elongated base or stationary member 12, a movable member 14, and a pair of link type supports 16 and 18.

The stationary member 12 includes an upstanding, substantially flat wall 20 and a flange 22 which is adapted to be connected to the floor of the vehicle. A plurality of reinforcing or stiffening ribs 24 are provided on the stationary member 12.

The upper edge 26 of the wall 20 is provided with a plurality of notches 28 which define a series of longitudinally spaced teeth which are used for a purpose to be hereinafter described.

The movable member 14 supports a seat 30 which is appropriately connected thereto as is well known in the art. The movable member 14 includes a pair of side flanges 32 and 34 which are interconnected by a web 36. The web 36 is provided with a longitudinally extending notch 38. The upper edge 26 of the wall 20 extends into the notch 38 and is spaced from the surfaces defining the notch 38 as best illustrated in FIGURES 2 and 3.

The wall 20 is provided with a pair of vertical slots 40 near the side edges thereof as best illustrated in FIGURE 1.

The forward link type support 16 is identical in construction to the rearward link type support 18 and therefore the same numerals will be used to identify similar parts of the supports 16 and 18.

Each support 16 and 18 includes a pair of guide links 42 and 44. The guide links are offset at the ends thereof as best illustrated in FIGURE 3 such that the upper ends are in surface-to-surface contact with the outside surfaces of the flanges 32 and 34, while the lower ends are in surface-to-surface contact with the opposite surfaces of the wall 20.

The upper ends of the guide links 42 and 44 are fixed to the flanges 32 and 34 by pivots 46 and 48 respectively. The lower ends of the guide links are connected by a pin 50 which is arranged to move in the slot 40 provided in the stationary member 12 as will be subsequently explained. The intermediate portion of the guide links 42 and 44 are spaced from the wall 20.

A pair of suspension links 52 and 54 are mounted on one end to the wall 20 about a fixed pivot 56. The pivot 56 is located directly above the slot 40 as best illustrated in FIGURE 1. The other ends of the suspension links 52 and 54 are offset and in surface-to-surface contact with the inner surfaces of the guide links 42 and 44 and contacted thereto by pivots 58 and 60 respectively.

The movable member 14 is provided with an upwardly raised portion 64 as best illustrated in FIGURE 1 which includes a substantially flat horizontal wall 66. A manually substantially horizontal latch 68 is pivotally mounted on the wall 66 through a pivot 70.

The latch 68 includes a handle 72 and a pair of spaced downwardly extending lugs 74 and 76 which are adapted to be received in the notches 28 to locate the movable member 14 in an adjusted position. The lugs 74 and 76 each have a width less than the width of one of the notches 28. The lugs 74 and 76 are spaced apart a distance spanning a plurality of notches 28 as best illustrated in FIGURE 1.

The latch 68 also includes a pair of arms 78 and 80, with arm 78 being longer than arm 80. Arm 78 is connected through a cross link 83 to a corresponding part associated with the opposite device 10. Arm 80 is connected through a return spring 84 to a corresponding part associated with the opposite device 10. The return spring 44 is effective to urge the lugs 74 and 76 into the opposing notches 28 upon release of the force on the handle 72.

The seat belt 80 is secured to the movable members 14 of the track assembly. The ends of the belt 80 are each provided with a reinforced flange 82 or the like which is connected to a support 84 on the movable member 14 by means of a threaded nut and bolt 86 as best illustrated in FIGURE 2.

In operation, assume that the seat 30 is located in the rearward position illustrated in FIGURE 1 and that it is desired to move the seat 30 forward in the direction of arrow A.

The operator of the vehicle takes hold of the handle 72 with his left hand and rotates the handle 72 about pivot 70 clockwise as viewed in FIGURE 4 in the direction of arrow B. As a result of this movement the lugs 74 and 76 are moved out of the notches 28 after which time the operator may move the seat 30 and its support 14 in the direction of arrow A.

It should be observed that after the latch 68 has been disengaged, the force applied to the movable support 14 is effective to swing the suspension links 42 and 44 and guide links 52 and 54 through arcs from the rearward positions indicated by letters C, D, and E in FIGURE 1 to the forward positions indicated by the letters C′, D′, and E.

The pivots 50 are moved downwardly and then upwardly in the slots 40 during movement of the seat 30 between the two limiting positions. After the seat 30 has been moved forwardly to the limiting position, the force on the handle 72 is reelased and the spring 84 urges the lugs 74 and 76 into engagement with the opposite notches 28.

It should be understood that various intermediate positions between the two limiting positions may be obtained as required.

With such a construction the seat 30 is movable fore and aft in a substantially horizontal plane through means of the swinging links. The forces, which are easily calculable, are applied generally longitudinally of the links and transversely of the pivot pins so that the stresses developed are essentially in tension and shear of true geometrical shapes.

The present design provides a sufficiently strong connection between the movable and stationary members such that the stresses can be readily calculated and the seat belt connected to the movable members rather than to the floor or body of the vehicle.

The drawings and the foregoing specification constitute a description of the improved vehicle seat track in such full, clear, concise, and exact terms as to enable any person skilled in the art to practice the invention, the scope of which is indicated by the appended claims.

What I claim as my invention is:

1. A slideless seat supporting and adjusting device comprising a stationary member having a pair of slots therein, one slot at each end portion of said stationary member, a movable frame member for supporting the seat, spaced guide links interconnecting said members, said guide links being pivoted at one of their ends to said movable frame member, pin means on the other ends of said guide links slidably received in said slots, spaced suspension links pivoted on one of their ends to said stationary member and on the other ends to intermediate portions of said guide links, said movable frame member being movable fore and aft relative to said stationary member in a substantially straight line through the movement of the aforesaid links, the top edge of said stationary member being substantially straight, latch means provided between said members to locate said movable frame member in a selected adjusted position, said latch means comprising a plurality of longitudinally spaced vertically arranged upwardly opening elongated notches in the top edge of said stationary member and a locking lever pivotally carried by said movable frame member, said lever including a substantially horizontal base pivotally connected to the under side of said movable frame member by means of a vertically mounted pivot pin, said base having a pair of downwardly extending teeth at opposite sides of said pivot pin selectively engageable with a pair of said notches so as to locate said movable frame member in a selected adjusted position, said teeth being spaced apart a distance spanning a plurality of said notches, said lever being rotatable in a horizontal plane in one direction to urge said teeth out of engagement with a pair of said notches to thereby permit adjustment of said movable frame member, and resilient means biasing the teeth of said latch in the opposite direction into the opposite pair of notches.

2. A slideless seat supporting and adjusting device defined in claim 1 wherein said slots are vertical.

3. A slideless seat supporting and adjusting device defined in claim 1 wherein the pivot connections between said suspension links and stationary member are located substantially directly above said vertical slots.

4. A slideless seat supporting and adjusting device defined in claim 1 wherein said guide links have a length greater than the length of said suspension links.

5. A slideless seat supporting and adjusting device defined in claim 1 wherein the corresponding pairs of suspension links and guide links each include two suspension links and two guide links which are arranged in sets on opposite sides of said stationary member.

References Cited in the file of this patent

UNITED STATES PATENTS

| | | |
|---|---|---|
| 2,092,787 | Thomas | Sept. 14, 1937 |
| 2,271,913 | Crabb | Feb. 3, 1942 |
| 2,880,789 | Leibinger | Apr. 7, 1959 |
| 2,942,647 | Pickles | June 28, 1960 |
| 3,008,681 | Mathews | Nov. 14, 1961 |